US008745324B2

(12) United States Patent
Kelkar et al.

(10) Patent No.: US 8,745,324 B2
(45) Date of Patent: *Jun. 3, 2014

(54) SMART OPTIMIZATION OF TRACKS FOR CLOUD COMPUTING

(71) Applicant: International Business Machines Corporation, Armonk, NY (US)

(72) Inventors: Bhooshan P. Kelkar, Pune (IN); Abhinay R. Nagpal, Pune (IN); Sandeep R. Patil, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/935,189

(22) Filed: Jul. 3, 2013

(65) Prior Publication Data
US 2013/0293981 A1    Nov. 7, 2013

Related U.S. Application Data

(63) Continuation of application No. 12/941,016, filed on Nov. 5, 2010, now Pat. No. 8,572,315.

(51) Int. Cl.
*G06F 12/00* (2006.01)
*G06F 3/06* (2006.01)
*G06F 12/02* (2006.01)

(52) U.S. Cl.
CPC .......... *G06F 3/061* (2013.01); *G06F 12/0246* (2013.01); *G06F 3/0614* (2013.01); *G06F 3/0625* (2013.01)
USPC .......................................... 711/112; 711/156

(58) Field of Classification Search
CPC ... G06F 12/0246; G06F 3/061; G06F 3/0614; G06F 3/0625
See application file for complete search history.

(56) References Cited

U.S. PATENT DOCUMENTS

| | | |
|---|---|---|
| 5,774,715 A | 6/1998 | Madany et al. |
| 6,178,058 B1 | 1/2001 | Pan et al. |
| 6,202,118 B1 | 3/2001 | Klein |
| 6,400,892 B1 | 6/2002 | Smith |
| 6,496,913 B1 | 12/2002 | Taugher et al. |
| 6,972,920 B2 | 12/2005 | Kim et al. |
| 7,197,433 B2 | 3/2007 | Patel et al. |

(Continued)

OTHER PUBLICATIONS

Pfeifer, R. et al., "Understanding Intelligence", The MIT Press; Sep. 24, 1999; all pages.

(Continued)

*Primary Examiner* — Reginald Bragdon
*Assistant Examiner* — Baboucarr Faal
(74) *Attorney, Agent, or Firm* — North Shore Patents, P.C.; Michele Liu Baillie

(57) ABSTRACT

Optimization of tracks on a hard disk includes: determining I/O characteristics for data clusters to be stored on the hard disk; generating a set of solutions for each possible placement configuration; for each solution, calculating a plurality of cost functions using the I/O characteristics for the plurality of data clusters; for each solution, calculating a membership value using the cost function values; for each solution, calculating a fitness value using the membership value; retaining the solutions with the fitness value greater than a predetermined threshold; determining whether at least one stopping condition has been met; if not, adding new solutions to the retained solutions to generate the next set of solutions; and repeating the calculating the membership value, the calculating the fitness value, and the retaining the solutions with the fitness value greater than the predetermined threshold until at least one stopping condition has been met.

3 Claims, 5 Drawing Sheets

(56) References Cited

U.S. PATENT DOCUMENTS

| | | |
|---|---|---|
| 7,272,735 B2 | 9/2007 | Fung |
| 7,325,095 B2 | 1/2008 | Williams |
| 7,373,268 B1 | 5/2008 | Viredaz et al. |
| 7,447,920 B2 | 11/2008 | Sharma et al. |
| 7,706,091 B2 | 4/2010 | Furuhashi et al. |
| 7,733,589 B2 | 6/2010 | Wada et al. |
| 7,747,907 B2 | 6/2010 | Olds et al. |
| 2004/0250029 A1 | 12/2004 | Ji et al. |
| 2005/0086651 A1 | 4/2005 | Yamamoto et al. |
| 2006/0112286 A1 | 5/2006 | Whalley et al. |
| 2006/0132954 A1 | 6/2006 | Wada et al. |
| 2008/0234873 A1 | 9/2008 | Gorbatov et al. |
| 2009/0113160 A1 | 4/2009 | Ferraro |
| 2009/0135693 A1 | 5/2009 | Kim et al. |
| 2009/0195902 A1 | 8/2009 | Moser et al. |
| 2009/0237842 A1 | 9/2009 | Ehrlich |
| 2009/0244775 A1 | 10/2009 | Ehrlich |
| 2009/0327250 A1 | 12/2009 | Green et al. |

OTHER PUBLICATIONS

Tang et al., "Understanding Adjacent Track Erasure in Discrete Track Media." IEEE Transactions on Magnetics, Sep. 2008; all pages.

Karabuto, A., "HDD Diet: Power Consumption and Heat Dissipation," iXBD Labs; Jul. 11, 2005; all pages.

Karabuto, Al., "HDD Diet 2: Power Consumption and Heat Dissipation of Enterprise Hard Disk Drives," iXBD Labs; Mar. 2, 2006; all pages.

MAC Performance Guide: Why You Need More Space Than You Need, Jun. 1, 2009; all pages.

"HP Announces 'Smart' Cooling Solution for Data Centers"; Jun. 2003; all pages.

Weston, "Greening the Data Center," Sep. 2010; all pages.

"Software as a Service (SaaS)"; Jan. 2010; all pages.

Rosenberg, "IBM takes to Amazon's EC2 cloud," Feb. 11, 2009; all pages.

"Fan—Efficiency and Power Consumption," The Engineering ToolBox; Mar. 2006; all pages.

Bitar, "Deploying Hybrid Storage Pools With Sun Flash Technology and the Solaris ZFS™ File System," Sun BluePrints™ Online, Sun Microsystems, Part No. 820-5881-10, Revision 1.0, Oct. 31, 2008; all pages.

Mearian, "Seagate hybrid drive delivers SSD performance at HDD price," May 24, 2010; all pages.

Weil et al., "CRUSH: Controlled, Scalable, Decentralized Placement of Replicated Data," IEEE; Nov. 2006; all pages.

"How Is Defragmentation Affected by New Storage Technologies? (SAN/RAID/SATA)," Defrag Tech Spotlight!, Diskeeper Corporation; Nov. 2008; all pages.

"New Fuzzy Logic Tools Simplify Programming for Motorola Microcontrollers," Business Wire, Oct. 6, 1997; all pages.

Saeedi et al., "Using Ant Colony Meta-Heuristic Approach for Cellular Manufacturing System"; Dec. 2008; all pages.

Doriego et al., "Ant colonies for the traveling salesman problem," BioSystems 43, pp. 73-81; Jul. 1997; all pages.

Korosec et al., "A Multilevel Ant-Colony-Optimization Algorithm for Mesh Partitioning"; International Journal of Pure and Applied Mathematics, vol. 5, No. 2; Jan. 2003; pp. 143-159.

"Data Center Power Management Enhancement for Energy Efficiency," IBM, IPCOM000182603D, May 4, 2009; all pages.

"Dynamic Thermal Mapping and Trend Analysis as a Control Mechanism for HVAC Systems in Data Centers," IBM, IPCOM000135036D, Mar. 27, 2006; all pages.

"Energy efficient cooling system for Data Center," IBM, IPCOM000182040D, Apr. 23, 2009; all pages.

Wehner, "Selbstorganisation im Superorganismus Kollektiv Intelligenz sozialer Insekten," Forschung und Technik, Jan. 14, 1998; all pages.

faculty.uscupstate.edu/atzacheva/SHIM450/KMeansExample.doc; Nov. 12, 2007; all pages.

Walker, IBM TDB, "Space Allocation on Direct Access Storage Device," IP.com No. IPCOM000054724D; Mar. 1, 1980; all pages.

Lenovo, "Prevention of Adjacent Track Interference on HDDs," IP.com No. IPCOM000142898D, IP.com Electronic Publication: Nov. 9, 2006; all pages.

k-means clustering, From Wikipedia, the free encyclopedia; Sep. 14, 2010; all pages.

"Gartner Says a Green Data Centre Means More than Energy Efficiency," Oct. 20, 2008; all pages.

"IBM Unveils Plan to Combat Data Center Energy Crisis; Allocates $1 Billion to Advance "Green" Technology and Services," May 10, 2007; all pages.

"IBM Project Big Green Tackles Global Energy Crisis," Jun. 11, 2008; all pages.

Fichera et al., "Power and Cooling Heat Up the Data Center," Mar. 8, 2006; all pages.

SMART OPTIMIZATION OF TRACKS FOR CLOUD COMPUTING

CROSS-REFERENCE TO RELATED APPLICATIONS

The present application is related to U.S. patent application Ser. No. 12/902,150, filed on Oct. 12, 2010, and is a continuation of U.S. Pat. No. 8,572,315, filed on Nov. 5, 2010.

BACKGROUND

The power consumption and performance of data centers are affected by the placement of data onto the hard drives of the data center. Several factors account for these effects, including data remanence, adjacent track erasure, power consumption in the event of a track refresh, and I/O throughput of different tracks on the hard drive.

Data remanence is an act of securely purging data such that there are no residuals of the data on the hard disk. Government regulations exist which mandate the need for secure deletion according to various standards. A hard disk drive includes one or more hard disks clamped to a rotating spindle and at least one head for reading or writing data on the disk. Storage on a hard disk is divided into "blocks", which are in turn grouped into "tracks". A disk head uses magnetism to read or write data onto the tracks. Data remanence involves the overwriting of blocks on a track by the disk head numerous times, depending on the standard being applied. Thus, data remanence involves multiple input/output (I/O) operations on the same blocks of a track.

As a track on the hard disk is written, adjacent tracks may be overwritten by the magnetic field generated in the disk head, and data recorded in the adjacent tracks may be erased or corrupted as a result. This phenomenon is called adjacent track erasure (ATE) or adjacent track interference (ATI) and are aggravated by the multiple overwrites required by secure deletion. In one approach to counter ATE or ATI, when a track has been overwritten a certain number of times, the adjacent tracks are read and rewritten, hence refreshing the data on the adjacent tracks. However, the I/O operations required in the refreshing of the adjacent tracks impose a performance penalty on the hard disk drive. Increasing the number of track refreshes also increases the power consumption of the hard drive.

The I/O throughput of different tracks of the hard drive affects the performance of the drive. Hard drives are fastest on the outer area of the drive. The outer area of the drive is about twice the circumference of the inner area, thus twice the data will pass under the drive's read/write heads with each rotation of the platter. The speed differential between the tracks in the outer area and the inner area of the drive leads to differentials in performance.

The challenge for the Information Technology (IT) owner is housing and operating the computational power of data centers for cloud computing. With more computational power in each unit volume, the industry is experiencing a significant increase in power density and hence a greater cooling challenge. The ability to tackle such computational tasks has driven energy costs higher.

BRIEF SUMMARY

According to one embodiment of the present invention, a method for optimization of tracks on a hard disk, includes: determining I/O characteristics for a plurality of data clusters to be stored on the hard disk; determining a plurality of costs of operation of the hard disk for a plurality of possible placement configurations of the plurality of data clusters, wherein the determining uses the I/O characteristics for the plurality of data clusters; and determining an optimal placement map for the plurality of data clusters from the plurality of costs of operation.

In one aspect of the invention, the method generates a set of solutions for a possible placement configuration, and for each solution, calculates a cost function value for a plurality of cost functions. Further, the method calculates for each solution a membership value using the cost function values, where the membership value represents how good the solution is as part of the optimal placement map, calculates for each solution a fitness value using the membership value, where the fitness value serves as an indication of how fit the solution is as part of the optimal placement map, retains the solutions with the fitness value greater than a predetermined threshold, determines whether at least one stopping condition has been met, adds new solutions to the retained solutions to generate the next set of solutions in response to determining that none of the stopping conditions have been met, and repeats the calculation of the membership value using the cost function values, the calculation of the fitness value using the membership value, and the retaining of the solutions with the fitness value greater than the predetermined threshold until at least one stopping condition has been met.

In one aspect of the method, the calculating of the membership value using the cost function values includes: for each cost function, calculating a base cost for the cost function as a current iteration cost divided by an optimum cost for the cost function; for each cost function, comparing the base cost with the optimum cost and a worst cost for the cost function; and for each cost function, setting the membership value for the cost function in response to the comparing of the base cost with the optimum cost and the worst cost for the cost function.

In one aspect of the method, the setting of the membership value for the cost function in response to the comparing of the base cost with the optimum cost and the worst cost for the cost function includes: in response determining that the base cost is better than or equal to the optimum cost, setting the membership value to 1.0; in response to determining that the base cost is worse than the worst cost, setting the membership value to 0.0; and in response to determining that the base cost is between the optimum cost and the worst cost, setting the membership value=(base cost−worst cost)/(1−worst cost).

In one aspect of the method, the calculating the fitness value using the membership value includes: selecting a lowest membership value among the membership values of the cost functions; and calculating the fitness value=($\beta$*(lowest membership value)+(1+$\beta$)* (sum of the membership values)/ (count of the membership values).

In one aspect of the method, the determining the plurality of costs of operation of the hard disk for the plurality of possible placement configurations of the plurality of data clusters includes: determining an objective function with a plurality of cost function values as variables; determining one or more constraints in terms of the variables; graphing the constraints; and shading a feasibility region on the graph.

In one aspect of the method, the determining the optimum placement map for the plurality of data clusters from the plurality of costs of operation includes: finding corner points of the feasibility region; determining the corner point that gives minimum values for the variables; and setting the placement configuration associated with the cost function values with the minimum values as the optimal placement map.

System and computer program products corresponding to the above-summarized methods are also described and claimed herein.

DETAILED DESCRIPTION

Figure 1:
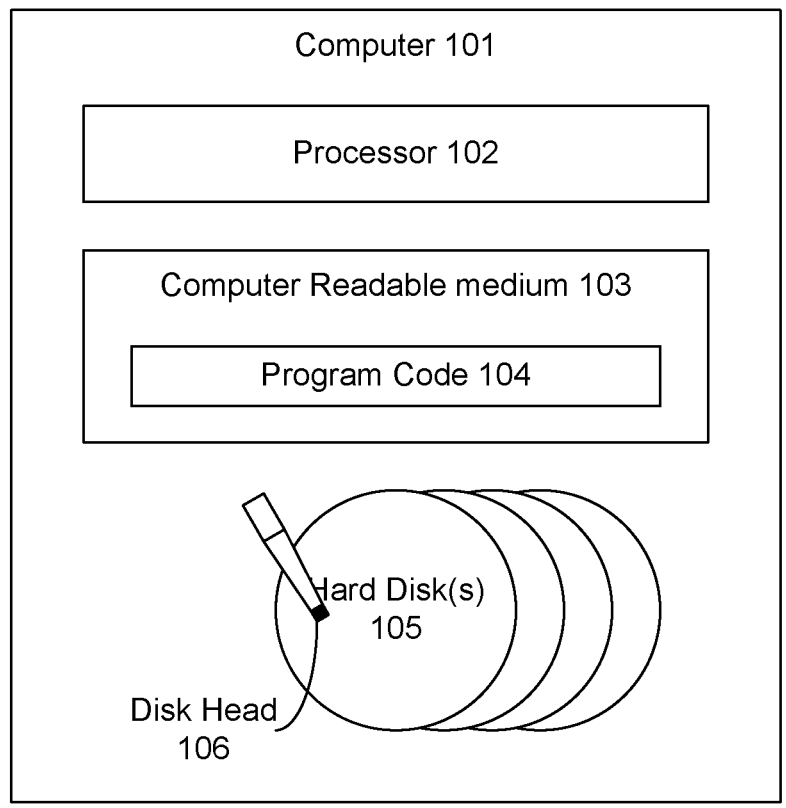
FIG. 1 illustrates an embodiment of a system for smart optimization of tracks on hard disks according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for smart optimization of tracks on hard disks according to the present invention. The system comprises a computer 101 operationally coupled to a hard disk drive comprising one or more hard disks 105, where data is read and written to tracks on the hard disk 105 by a disk head 106. The computer 101 is further operationally coupled to a processor 102 and a computer readable medium 103. The computer readable medium 103 stores computer readable program code 104 for implementing the method of the present invention. The processor 102 executes the program code 104 for smart optimization of tracks on hard disks 105 according to the various embodiments of the present invention.

An embodiment of the method of the present invention models future changes of the data to be stored on the hard drive and predicts the optimal placement map for the data, such that the remanence and performance needs are met and optimum usage of power consumed by the hard drive is accomplished. The operation intensive data are further identified and its placement considered to enhance performance.

In one embodiment, data with similar I/O characteristics are assigned to the same category and clustered in one or more continuous tracks on the hard disk 105. By performing this clustering, blocks with a high number of I/O operations are grouped and stored on fewer tracks than if they were scattered across numerous tracks. This reduces the number of tracks experiencing a high number of I/O operations. The I/O characteristics may include, but is not limited to, the access frequency of the plurality of blocks, the secure deletion requirements, and a time dimension where the access frequencies of blocks may vary from time period to time period. However, a question arises in determining the placement of these data clusters on the hard disk 105 to optimize performance and power consumption. Although the following embodiment(s) are described in the context of data clusters as set forth here, one of ordinary skill in the art will understand that other methods of clustering data may be used without departing from the spirit and scope of the present invention. Additionally, data clusters of any size may be used, including a cluster comprising one block.

Figure 2:
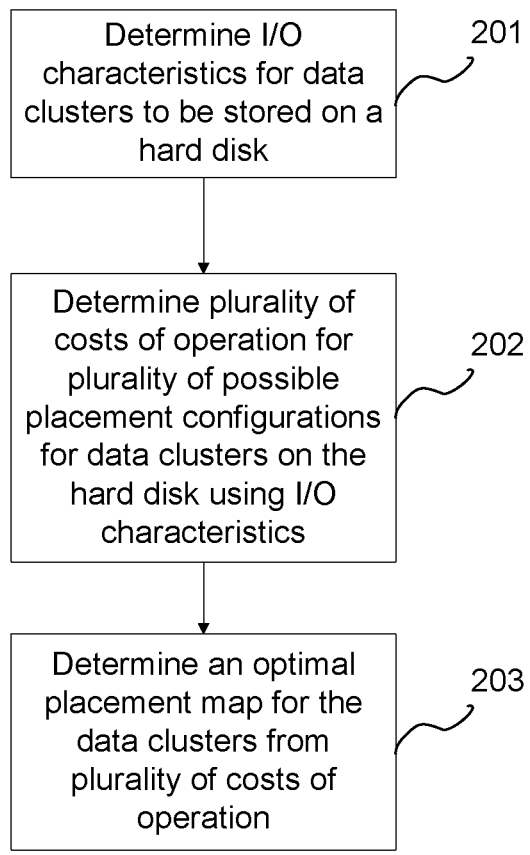
FIG. 2 is a flowchart illustrating an embodiment for smart optimization of tracks on hard disks according to the present invention.

FIG. 2 is a flowchart illustrating an embodiment for smart optimization of tracks on hard disks according to the present invention. The method determines the I/O characteristics of data clusters to be stored on the hard disk 105 (201). Using the I/O characteristics, the method determines a plurality of costs of operation of the hard disk 105 for a plurality of possible placement configurations for the data clusters on the hard disk 105 (202). From the plurality of costs of operation, the method determines an optimal placement map for the data clusters (203).

In this embodiment, the optimal placement map is determined using a multivariate fuzzy cost model which takes into account any combination of characteristics, including but not limited to: track characteristics; data remanence levels; I/O throughput or delay; ATE-data refresh I/O and power penalties; and frequency of access and usage pattern of data impacting power consumption.

For example, track characteristics may include, but are not limited to, outer disk tracks being computationally expensive to refresh since they are bigger in size. Thus, blocks with high remanence levels may be clustered together and placed on an inner track of the hard disk 105 to lessen the efforts to refresh adjacent racks, in turn lessening the power and performance penalty.

For another example, the outer tracks of the disk have a larger circumference and thus require less effort to access the data. Blocks with high access frequency or usage may be clustered together and placed on an outer track of the hard disk to lessen the performance penalty. Seek time is lessened because the disk head 106 traverse only a narrow band. Data transfer rate is increased because more data passes by the disk head 106 with each revolution of the hard disk 105.

In an embodiment of the present invention, an ant colony optimization (ACO) algorithm is used to find the optimal placement map. The ACO algorithm is a meta-heuristic approach that uses a combination of distributed computation, positive feedback, and constructive greediness to find an optimal solution for combinatorial optimization problems. The concept of the ACO is known in the art and will not be described in detail here.

In the current context, a search space, i.e., the tracks on the hard disk 105, is defined by the combination of characteristics used in the cost model. Each ant would represent a data cluster, and the search for the optimal placements of the data clusters is represented by the movements of the ants. Each ant searches for a minimum feasible cost partial solution. An ant can be assigned a start state and more than one stopping conditions. Ants start from the start state and move to feasible neighbor states, building the solution in an incremental way. The iterations stop when at least one stopping conditions for ant is satisfied. The ant can chose a neighbor state through probabilistic decision rules. A probabilistic rule is a function of the values stored in a node local data structure obtained from pheromone trails and heuristic values, the ant's own memory from previous iteration, and the problem constraints.

Figure 3:
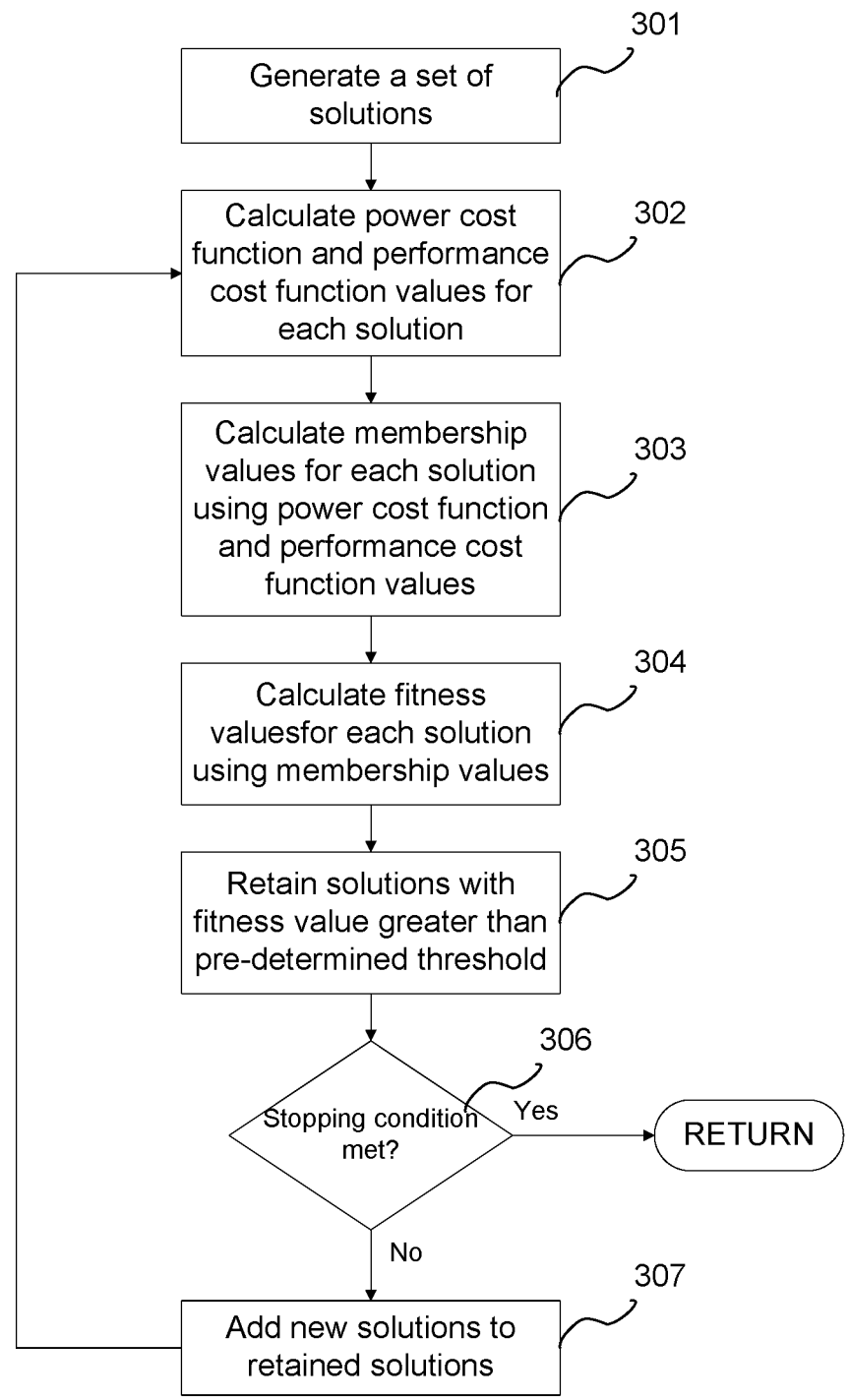
FIG. 3 is a flowchart illustrating an embodiment of a method of determining an optimal placement map using the ant colony optimization algorithm in accordance with the present invention.

FIG. 3 is a flowchart illustrating an embodiment of a method of determining an optimal placement map using the ant colony optimization algorithm in accordance with the present invention. The method begins by generating a set of solutions (301). In this embodiment, each ant represents a solution comprising a data cluster placed on the hard disk. The method calculates a power cost function value and a performance cost function value values for each solution (302). Other cost functions may be used without departing from the spirit and scope of the present invention. The power cost function and the performance cost functions are described further below. The method calculates membership values for each solution using the power cost function value and the performance cost function value (303). In this embodiment, the membership values represent how "good" the solution is compared with the optimum and the worst values for a cost function. The fitness value for each solution is calculated using the membership values (304). In this embodiment, the fitness value serves as an indication of how "fit" the solution is as part of an optimal placement map. The calculation of the membership values and the fitness values are described further below. The method retains the solutions with a fitness value greater than a pre-determined threshold (305). The threshold may be set by a system administrator or through the use of a learning algorithm. The method then determines if at least one of the stopping conditions is met (306). For example, when only one set of solutions keeps repeating, then an optimum solution can be determined to have been found, and the iterations end. For another example, a pre-determined number of iterations can be set as a stopping condition. In response to determining that none of the stopping conditions have been met, new solutions are added to the retained solutions (307). The new solutions represent the "ants" of the retained solutions moving to a neighboring state. These solutions then become the set of solutions for the next iteration of the method, and steps 302-305 are repeated. When at least one of the stopping conditions is met (306), the current set of solutions is determined to be the optimal placement map.

In one embodiment, the power cost function calculates the power dissipated by the data cluster configuration on the different tracks. The power cost function is calculated for each data cluster by adding the parallel power consumptions by calculating median frequency of access, the parallel power consumptions by calculating remanence levels, the parallel power consumptions by the track refresh operation, and the power dissipation. Whether the data cluster would be placed in multiple tracks on the hard disk is considered as well. For example, if the data cluster was placed in multiple inner tracks of the hard disk, then the track refresh operation would be required for multiple adjacent tracks, increasing the power consumption for this solution. The average power consumption during intensive hard disk operations, such as defragmenting disks, scanning the surface, copying files, checking files for viruses in the background, etc., can be defined by the following formula:

$$P\text{max}=(\text{write}+\text{seek}+\text{read}*3)/5$$

The average hard disk power consumption for typical operations of a user can be defined by the following formula:

$$P\text{typ}=(\text{idle}*90\%+\text{write}*2.5\%+\text{read}*7.5\%)/100\%,$$

where the lettered modes denote the power consumption of a drive from both voltage sources in the corresponding modes and the digits (multipliers for these power values) denote percentage of the hard disk drive mode duration. The maximum power consumption values for reading and writing are used, which correspond to the beginning zones of a hard disk. The seek mode is metered through the reading and writing. This model is based on the assumption that read/write hard disk drive operations make up 10% of the total time for the typical desktop usage.

Thus, the power dissipation is calculated as a function of the average power consumption during intensive hard disk operations, the average hard disk power consumption for typical operations, and the circumference of the hard disk:

$$F(P\text{typ}=(\text{Idle}*90\%+\text{Write}*2.5\%+\text{Read}*7.5\%)/100\%,\\ P\text{max}=(\text{Write}+\text{Seek}+\text{Read}*3)/5,\\ \text{circumference}=p*\text{diameter})$$

For another example, a performance cost function calculates the performance gain by the extent configuration on the different tracks. The performance cost function is calculated for each data cluster by adding the parallel I/O throughput by calculating the median frequency of access and the I/O throughput of a track refresh. Whether the data cluster would reside in multiple tracks on the hard disk is considered as well.

Figure 4:
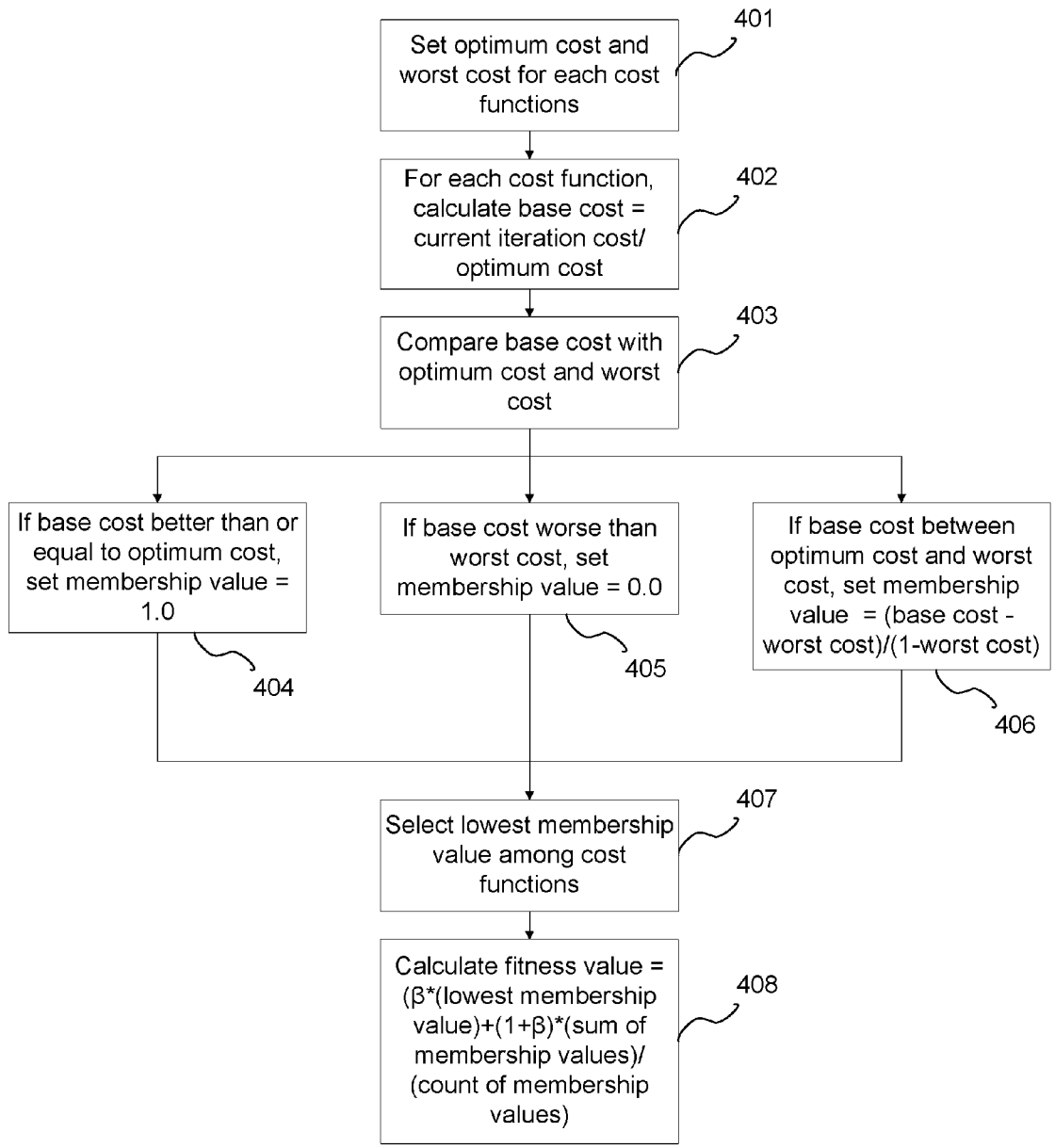
FIG. 4 is a flowchart illustrating an embodiment a method of calculating membership values and fitness values according to the present invention.

FIG. 4 is a flowchart illustrating an embodiment a method of calculating membership values and fitness values according to the present invention. To calculate the membership and fitness values of a solution, an optimum cost and a worst cost for each cost function is set (401). The remaining steps 402-406 are repeated for each cost function. The method calculates the base cost for a cost function by dividing the current iteration cost by the optimum cost (402). The method compares the base cost with the optimum cost and the worst cost (403). If the current cost is better than or equal to the optimum cost, then a membership value for the cost function is set to 1.0 (404). If the base cost is worse than the worst cost, then the membership value for the cost function is set to 0.0 (405). If the base cost falls between the optimum and the worst costs, then the membership value for the cost function=(base cost−worst cost)/(1−worst cost) (406).

The method selects the lowest membership value among (??) (407), and calculates a fitness value (408) as follows:

$$\text{Fitness}=\beta*(\text{lowest membership value})+(1+\beta)*(\text{sum of membership values})/(\text{count of membership values}),$$

where β is a parameter set by the system administrator or by a learning algorithm to implement the pre-determined threshold. The fitness value for each cost function is used to determine which solutions to retain, as set forth above.

Although an embodiment of the present invention is described above using the ant colony optimization algorithm in determining an optimal placement map, one of ordinary skill in the art will understand that other optimization algorithms may be used without departing from the spirit and scope of the present invention. For example, a minimization linear programming technique may be used, if the problem can be expressed using linear equations.

Figure 5:
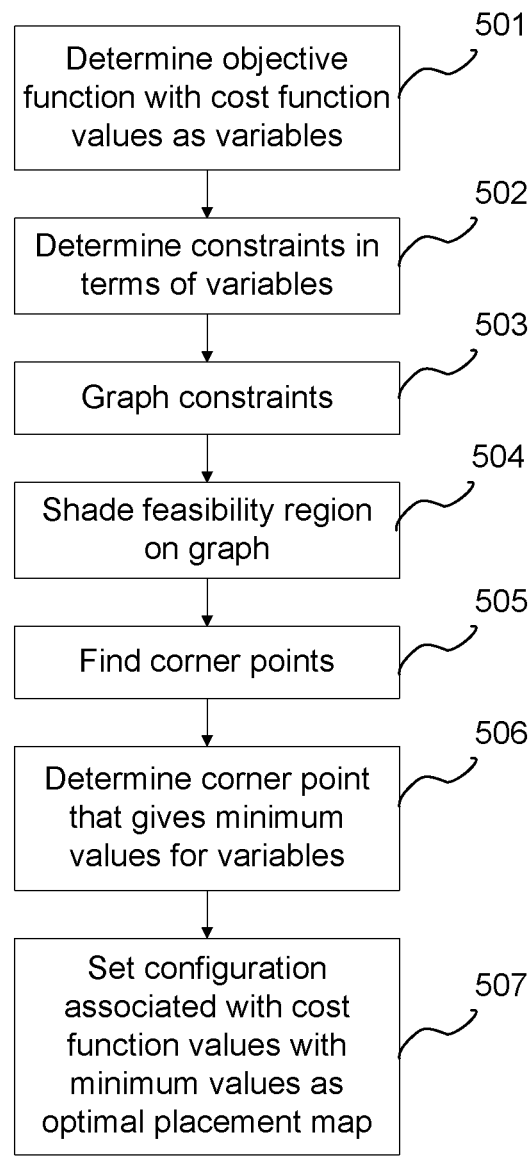
FIG. 5 is a flowchart illustrating an embodiment a method of determining an optimal placement map using a minimization linear programming algorithm in accordance with the present invention.

FIG. 5 is a flowchart illustrating an embodiment a method of determining an optimal placement map using a minimization linear programming algorithm in accordance with the present invention. The method determines an objective function with the cost function values as variables (501), and the constraints are determined in terms of the variables (502). For example, one of the constraints is that the variables for the placement map are non-negative: x≥0; y≥0. For example, 'x' may be the value of the power cost function, while 'y' may be the value of the performance cost function. The constraints are then graphed (503), and the feasibility region on the graph shaded (504). The corner points of the shaded region are found (505). The corner point that gives the minimum values for the variables is determined (506). The minimum values may be found by finding the value of the objective function at each corner point. Alternatively, a line associated with the objective function may be moved until the minimum values are found. The configuration associated with the cost function values with the minimum values are then set as the optimal placement map (507).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer program product for optimization of tracks on a hard disk, the computer program product comprising: a non-transitory computer readable storage medium having computer readable program code embodied therewith, the computer readable program code configured to: determine I/O characteristics for a plurality of data clusters to be stored on the hard disk; generate a set of solutions for each possible placement configuration for the plurality of data clusters; for each solution, calculate a cost function value for a plurality of cost functions using the I/O characteristics for the plurality of data clusters; for each solution, calculate a membership value using the cost function values, wherein the membership value represents how good the solution is as part of an optimal placement map; for each solution, calculate a fitness value using the membership value, wherein the fitness value serves as an indication of how fit the solution is as part of the optimal placement map; retain the solutions with the fitness value greater than a predetermined threshold; determine whether at least one stopping condition has been met; in response to determining that none of the stopping conditions have been met, add new solutions to the retained solutions to generate the next set of solutions; and repeat the calculating of the membership value using the cost function values, the calculating of the fitness value using the membership value, and the retaining of the solutions with the fitness value greater than the predetermined threshold until at least one stopping condition has been met.

2. A system, comprising: at least one hard disk comprising a plurality of tracks; a processor; and a computer readable storage medium operationally coupled to the processor, the computer readable storage medium having computer readable program code embodied therewith to be executed by the processor, the computer readable program code configured to: determine I/O characteristics for a plurality of data clusters to be stored on the hard disk; generate a set of solutions for each possible placement configuration for the plurality of data clusters; for each solution, calculate a cost function value for a plurality of cost functions using the I/O characteristics for the plurality of data clusters: for each solution, calculate a membership value using the cost function values, wherein the membership value represents how good the solution is as part of an optimal placement map; for each solution, calculate a fitness value using the membership value, wherein the fitness value serves as an indication of how fit the solution is as part of the optimal placement map; retain the solutions with the fitness value greater than a predetermined threshold; determine whether at least one stopping condition has been met; in response to determining that none of the stopping conditions have been met, add new solutions to the retained solutions to generate the next set of solutions; and repeat the calculating of the membership value using the cost function values, the calculating of the fitness value using the membership value, and the retaining of the solutions with the fitness value greater than the predetermined threshold until at least one stopping condition has been met.

3. A method for optimization of tracks on a hard disk, comprising: determining I/O characteristics for a plurality of data clusters to be stored on the hard disk; generating a set of solutions for each possible placement configuration for the plurality of data clusters; for each solution, calculating a cost function value for a plurality of cost functions using the I/O characteristics for the plurality of data clusters; for each solution, calculating a membership value using the cost function values, wherein the membership value represents how good the solution is as part of an optimal placement map; for each solution, calculating a fitness value using the membership value, wherein the fitness value serves as an indication of how fit the solution is as part of the optimal placement map; retaining the solutions with the fitness value greater than a predetermined threshold; determining whether at least one stopping condition has been met; in response to determining that none of the stopping conditions have been met, adding new solutions to the retained solutions to generate the next set of solutions; and repeating the calculating the membership value using the cost function values, the calculating the fitness value using the membership value, and the retaining the solutions with the fitness value greater than the predetermined threshold until at least one stopping condition has been met.

* * * * *